United States Patent [19]
Mundt et al.

[11] Patent Number: 5,791,850
[45] Date of Patent: Aug. 11, 1998

[54] VACUUM COMPATIBLE FASTENER AND FASTENING SYSTEM

[75] Inventors: Randall S. Mundt, Pleasanton; Valentine Balter, Cupertino, both of Calif.

[73] Assignee: LAM Research Corporation, Fremont, Calif.

[21] Appl. No.: 671,687

[22] Filed: Jun. 28, 1996

[51] Int. Cl.$^6$ .................. F16B 19/00; F16B 13/04
[52] U.S. Cl. .................. 411/508; 411/21; 411/392; 411/913
[58] Field of Search .................. 411/21, 392, 343, 411/508, 509, 510, 907, 908, 913

[56] References Cited

U.S. PATENT DOCUMENTS

| | | |
|---|---|---|
| 2,509,192 | 5/1950 | Poupitch .................. 411/508 |
| 2,560,530 | 7/1951 | Burdick .................. 411/508 |
| 3,747,169 | 7/1973 | Anderson et al. . |
| 3,827,125 | 8/1974 | Matthews . |
| 4,014,438 | 3/1977 | O'Toole et al. . |
| 4,204,566 | 5/1980 | Kirrish et al. . |
| 4,270,035 | 5/1981 | Richter, Sr. . |
| 4,591,203 | 5/1986 | Furman .................. 411/510 X |
| 4,947,502 | 8/1990 | Engelhardt .................. 411/392 X |
| 5,061,137 | 10/1991 | Gourd .................. 411/392 X |

*Primary Examiner*—Neill R. Wilson
*Attorney, Agent, or Firm*—Burns, Doane, Swecker & Mathis, L.L.P.

[57] ABSTRACT

A vacuum compatible fastener useful for fastening a workpiece. The fastener has a head section at an upper end of the fastener of a first diameter. A shank section extends from the head section and includes a spring or spring-like element which allows the fastener to be stretched and pretensioned. The shank section has a diameter less than the diameter of the head section. A tip section at a lower end of the fastener extends from the shank section. The tip section includes one or more retractable elements having upper ends extending radially outward away from the tip section in the non-retracted state for gripping a sidewall of a workpiece receiving hole. An opening extends along the central axis of the fastener through the head section to the tip section. The fastener minimizes contamination and allows high pump-down rates in vacuum processing tools such as semiconductor manufacturing process tools.

27 Claims, 4 Drawing Sheets

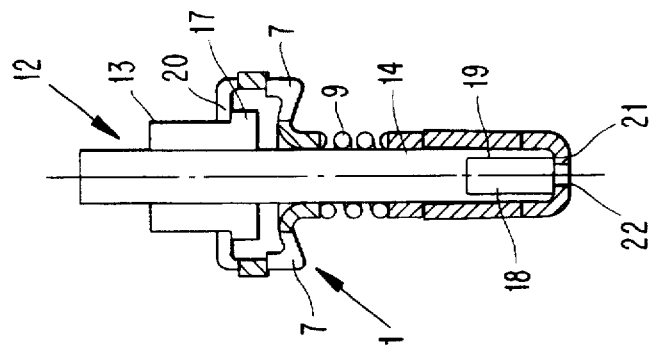
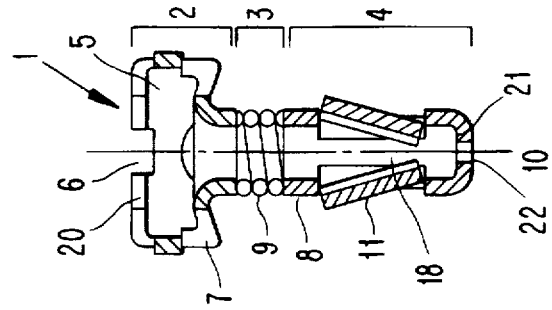
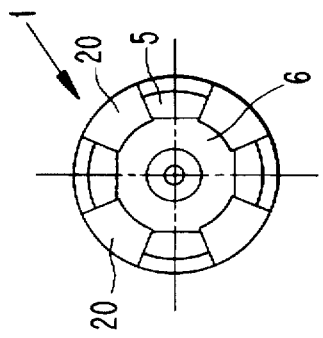

5,791,850

1

VACUUM COMPATIBLE FASTENER AND FASTENING SYSTEM

FIELD OF THE INVENTION

The invention relates to a fastener which is compatible with a vacuum environment, and more particularly, to a fastener and fastening system which can be employed in a high vacuum processing apparatus such as a semiconductor processing apparatus.

BACKGROUND OF THE INVENTION

Many process steps in the manufacture of integrated circuits (ICs) are carried out in a vacuum environment. Among the IC manufacturing processes taking place under vacuum are ion implantation, sputtering, etching and chemical vapor deposition (CVD) processes.

The vacuum chamber(s) of such processing tools may be exposed to atmospheric pressure during maintenance thereof, e.g., during chamber cleaning and repair, and in some processing tools, at the time substrates are loaded into the reaction chamber. In any instance, prior to treating a substrate, the reaction chamber is evacuated by one or more vacuum pumps until a desired base pressure is reached. During evacuation, gases and/or vapors are removed from the chamber.

To maximize processing throughput of vacuum processing tools, the capability of rapid pumpdown to base pressure is highly desirable. Especially in the high vacuum range, the effects of surface outgassing, virtual leaks, and conductance restrictions can dominate system performance, particularly pumpdown time and cleanliness levels. The magnitudes of these effects are often dependent on subtle design details.

In vacuum processing tools, fasteners are required to secure workpieces within the vacuum chamber. As used herein, the term "workpiece" refers to any component or structure disposed within the vacuum chamber which can be secured by means of one or more fasteners. Examples of workpieces secured by fasteners include, but are not limited to, shields, electrodes and gas distribution heads.

Conventionally, threaded fasteners such as screws, nuts and bolts have been used in securing workpieces within a vacuum chamber. However, such fasteners can adversely impact operation of vacuum processing tools, especially processing tools requiring a high vacuum. As used herein, "high vacuum" is defined as a pressure in the range of from $10^{-3}$ to $10^{-7}$ mbar.

With threaded fasteners, significant amounts of contaminating materials can be trapped in blind holes or in the grooves between the threads. The relatively large areas of surface-to-surface contact in threaded fasteners are prone to trapping and slow release of contaminating materials. Even when cleaned, the contaminating materials cannot be totally removed, as a result of the roughened textured surface characteristics of the threaded fasteners.

The above problems associated with threaded fasteners are particularly noticeable when the fasteners are exposed to large pressure fluctuations and when liquid cleaning agents are used to treat the fasteners. Fasteners are subjected to large pressure fluctuations, for example, whenever the vacuum chamber is vented or exposed to atmospheric pressure and then pumped down again to base pressure.

Furthermore, the absence of an adsorbed gas layer on the threaded portion of the fasteners which is normally present at higher pressures can cause galling or seizing in threaded fasteners due to the high point loading and wiping action in the threads. This can interfere with maintenance and repair tasks, substantially increasing the mean time to repair as well as maintenance costs.

In addition to the above problems, relatively large frictional forces encountered when securing workpieces with threaded fasteners and when removing threaded fasteners from workpieces can result in the production of large quantities of metallic particles. Such metallic particles are particularly detrimental to the IC devices formed in the processing tools. Given the extremely fine dimensions of the device features, particles having sizes in the submicron range can adversely impact product yield.

Therefore, conventionally used threaded fasteners are unsuitable for use in vacuum environments, and more particularly, in semiconductor processes taking place in vacuum environments.

SUMMARY OF THE INVENTION

It is an object of the present invention to overcome the above described problems associated with the use of threaded fasteners in vacuum environments, and more particularly in semiconductor processing tools operating under vacuum.

The invention provides a vacuum compatible fastener useful for attachment to a workpiece. The fastener has a head section at an upper end of the fastener of a first diameter. A shank section extends from the head section, and comprises an elastic element which allows the fastener to be stretched and pretensioned. The shank section has a diameter less than the diameter of the head section. A tip section at a lower end of the fastener extends from the shank section. The tip section includes one or more retractable elements for gripping a sidewall of a receiving hole in a workpiece. An opening extends through the head section and a channel extends through the tip section to allow outgassing of the fastener and hole during pumpdown in a vacuum environment.

The invention also provides a fastening system comprising the inventive vacuum compatible fastener and an installation tool capable of installing and removing the fastener.

The invention further provides a method for fastening a workpiece with the inventive vacuum compatible fastener. According to the process, an installation tool is inserted into the opening in the fastener. The installation tool engages and holds the fastener head section, stretches the fastener shank section in an axial direction, thereby pretensioning the shank section, and retracts the retractable elements at the tip of the fastener. The pretensioned fastener is then inserted into a fastener receiving hole in the workpiece. The retractable elements at the tip of the fastener are then engaged with the hole sidewalls by rotating the installation tool. The fastener head section is next disengaged from the installation tool which is then withdrawn from the opening in the fastener. A lower surface of the head section is thus secured against the workpiece by the tension in the shank section.

BRIEF DESCRIPTION OF THE DRAWINGS

The invention will be described in greater detail with reference to the accompanying drawings in which like elements bear like reference numerals, and wherein:

FIGS. 1A and 1B are plan and side-sectional views, respectively, of a vacuum compatible fastener in the static state according to the present invention.

FIG. 2 is a side-sectional view of a vacuum compatible fastener according to the present invention in the ready for insertion state with an installation tool connected to the fastener.

DETAILED DESCRIPTION OF THE PREFERRED EMBODIMENTS

Figure 4:
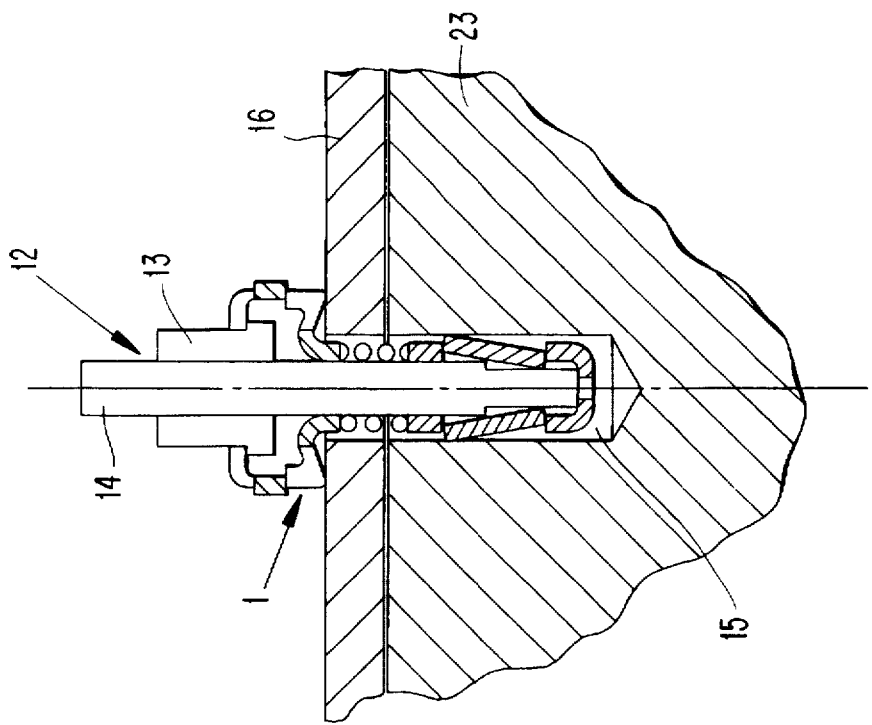
FIG. 4 is a side-sectional view of a vacuum compatible fastener according to the present invention inserted into a workpiece in the engaged position with an installation tool connected to the fastener.

As shown in FIGS. 1A and 1B, the vacuum compatible fastener 1 according to the present invention is comprised of three main sections: (a) head section 2; (b) shank section 3; and (c) a tip section 4.

Head section 2 is located at an upper end of fastener 1, and serves two primary functions. During installation of the fastener, the fastener is manipulated by an installation tool which grasps head section 2, which provides one or more surfaces which can be gripped by the installation tool. These surfaces can take the form of tabs 20, which are disposed along an upper surface of head section 2, extending from the outer diameter towards the center of head section 2. The diameter of the head section is greater than that of both the shank and tip sections. Head section 2 is substantially hollow, and the upper surface thereof further includes an opening 6 having dimensions allowing the fastening tool to be inserted into the fastener. Further, head section 2 includes perforations 5 which allow outgassing of the fastener and a hole in which the fastener is located during pumpdown in a vacuum environment.

Figure 3:
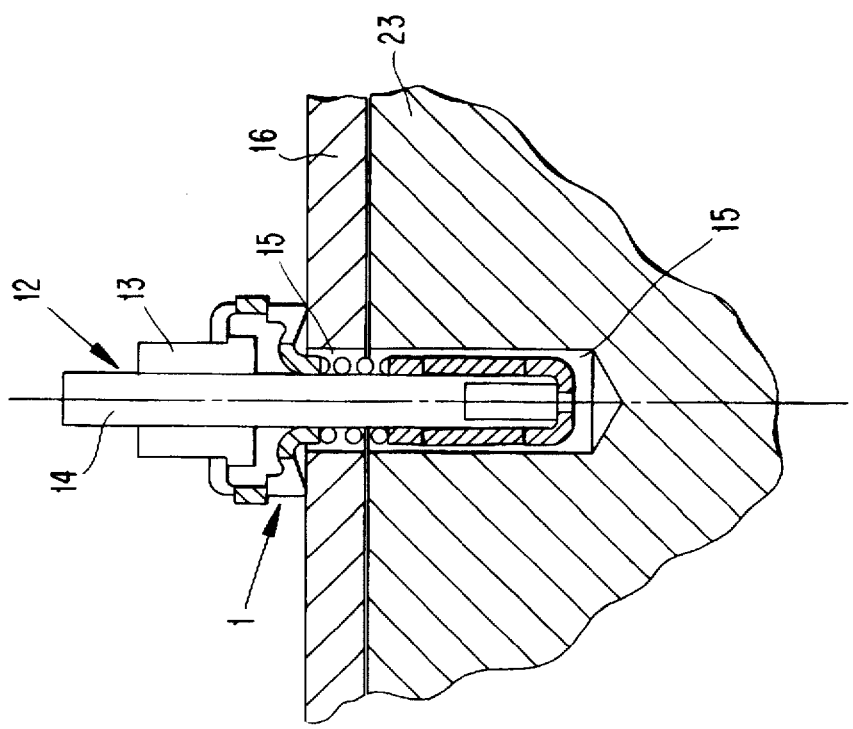
FIG. 3 is a side-sectional view of a vacuum compatible fastener according to the present invention inserted into a workpiece in the ready for insertion state with an installation tool connected to the fastener.
Figure 5:
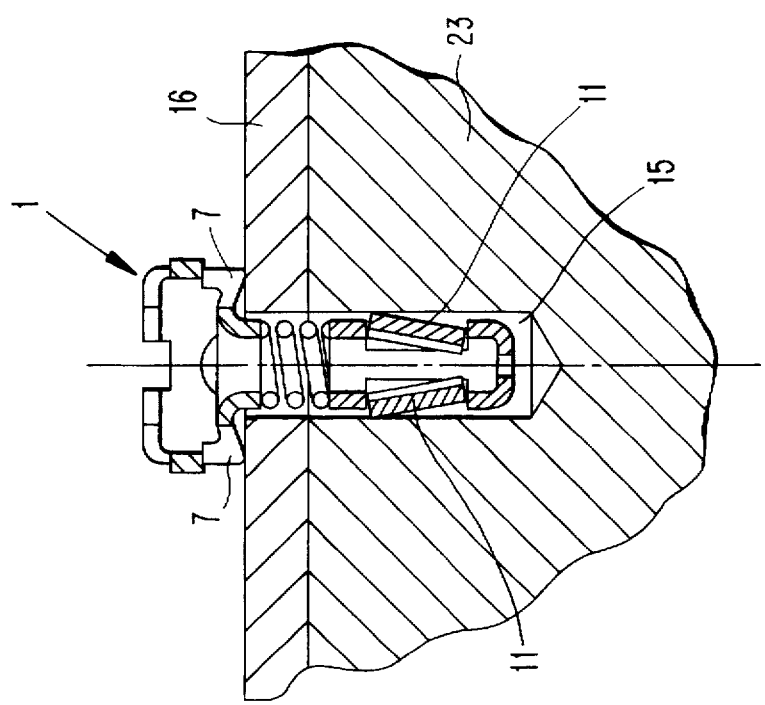
FIG. 5 is a side-sectional view of a vacuum compatible fastener according to the present invention inserted into a workpiece in the engaged position after removal of the installation tool.

Upon installation of the inventive fastener into a fastener receiving hole 15 in a workpiece, one or more bearing surfaces on the head section 2 are brought into contact with the workpiece 16 being secured (see FIGS. 3–5). The total area of contact between the fastener head section 2 and workpiece is preferably minimized, so as to minimize the volume of gas trapped between the fastener and workpiece upper surface. As a result, the inventive fasteners exhibit a significant reduction in the extent of outgassing during pumpdown of a vacuum chamber, as well as improved conductance compared to threaded fasteners.

The lower surface of the fastener can include four circumferentially spaced-apart projections 7 so as to minimize the area of contact between the fastener and workpiece being secured. In a preferred embodiment, the projections 7 contact the workpiece at a plurality of points such as along an annular path adjacent an outer periphery of the head section. If desired, the projections which contact the workpiece can have sharp edges which bite into the surface of the workpiece, thereby further securing the workpiece.

The material of construction of the head section can comprise metallic, ceramic or composite materials, e.g., a unitary material or coated material which is preferably compatible in a high vacuum environment, and also compatible with the process gases being used in the processing tool. The material's hardness is preferably greater than that of the workpiece to allow the lower surface of the head section to bite into the workpiece. For instance, the workpiece can comprise aluminum or anodized aluminum and the head section can be of stainless steel or a material coated with a layer having high hardness.

Figure 6B:
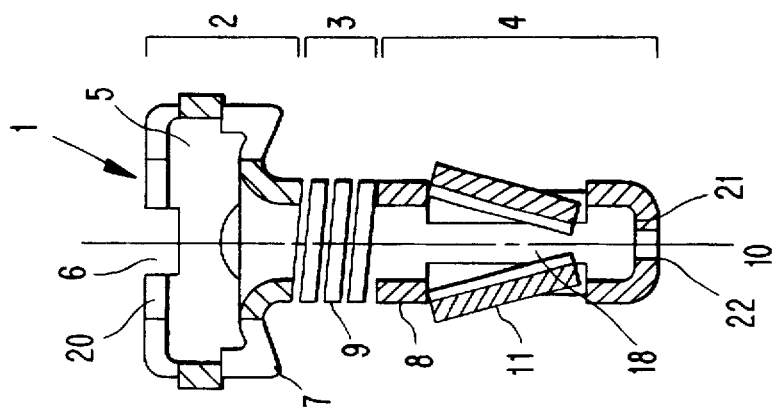
FIGS. 6A and 6B are side-sectional views of a vacuum compatible fastener according to further aspects of the invention.
Figure 6A:
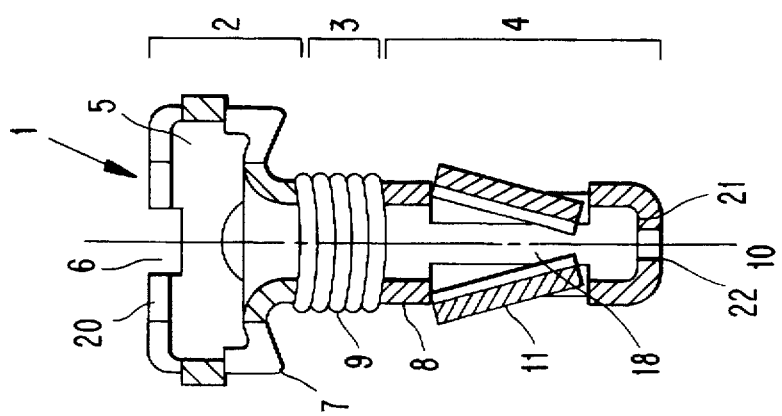

Shank section 3 includes an elastic member such as a tension spring or spring-like element 9. The spring or spring-like element 9 can be either separate from or formed integral with the head section 2. For example, spring or spring-like element 9 can take the form of prefabricated tension spring segments welded at one end to head 2 and welded at the other end to the tip section. Alternatively, a bellows-like structure (FIG. 6A) or one or more circumferential spiral cuts (FIG. 6B) in a tubular member forming the lower portion of the head section 2 could constitute the spring-like element. The spring or spring-like element can have any desired shape or cross-section such as a round or square cross-section, taken in a radially oriented plane parallel to a central axis 10 of the spring or spring-like element.

During installation of fastener 1, shank section 3 is stretched and pretensioned by an installation tool, thereby providing a tension, or spring-like force which biases the tip section 4 towards the head section 2 when the fastener is engaged with the workpiece. The mechanical properties of the shank section should be such as to provide a specific design load for a given distance of travel. This load is established when the shank section is stretched.

Suitable materials of construction for the spring or spring-like element include any material which can be stretched and pretensioned by the installation tool, and which is compatible with the processing environment inside the vacuum chamber. Examples of materials exhibiting the requisite mechanical properties include stainless steel, aluminum, copper and alloys thereof such as bronze.

Tip section 4 of the inventive vacuum compatible fastener includes a tubular section 8 and one or more retractable clamping elements 11 which include upper edges designed to dig into and grip the sidewalls of receiving hole 15 in the workpiece. The tubular section 8 includes a channel therethrough and a tip 21 having a hole 22 therein to allow evacuation through the fastener. As shown in FIG. 2, in the retracted state, the retractable elements 11 are generally coextensive with the tubular section 8. In the extended state, upper ends of the retractable elements extend outward, away from the tubular section 8, as shown in FIG. 1B.

Figure 7:
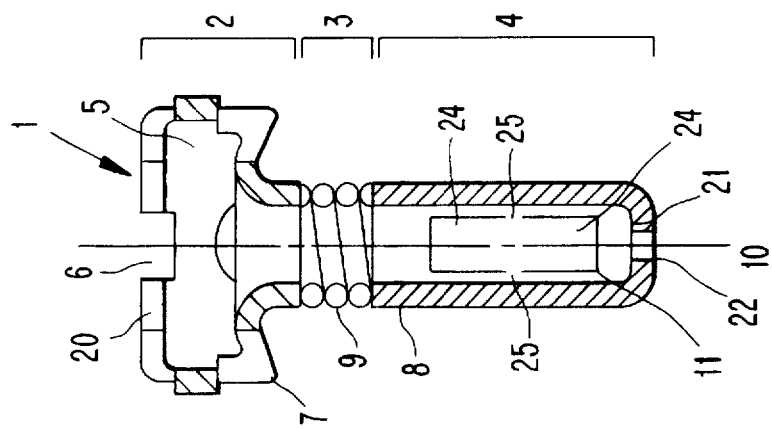
FIG. 7 is a side-sectional view of a vacuum compatible fastener according to a further aspect of the invention.

Retractable elements 11 can be formed in various ways. For example, retractable elements 11 can be formed by suitably shaped cutouts in the tubular section 8. For example, each element 11 can be formed by a pair of U-shaped cuts 24 in the tubular section, the ends of the U-shaped cutouts being spaced apart such that two thin connecting portions 25 between the cutouts connect the retractable element 11 to the tubular section 8 (FIG. 7). In such a case, clamping element 11 is a rigid element which is resiliently attached to the tubular section 8. The resilient connection causes the clamping element to extend outwardly relative to tubular section 8. Alternatively, the elements 11 can comprise discrete pieces pivotally attached in a manner which allows them to rotate about a central section thereof such as by means of a torsion spring element. The elements can have different constructions such as teeth-like structures, barbs, leaf springs, a clamp ring or a collet-like element having one or more sharp edges or points where contact is to be made with one or more walls of a fastener receiving hole in the workpiece. Other suitable retractable element structure designs will be apparent to persons of ordinary skill in the art. The contact area between the retractable elements and the hole walls is preferably minimized and confined to the tips or edges of retractable elements 11.

The material of the retractable elements at least at the points of contact with the hole walls is preferably of greater hardness than that of the receiving hole. Additionally, the edges or points of retractable elements 11 can be designed so as to bite into and grip the receiving hole walls, such that the fastener is held firmly in place. Stainless steel is a preferred material of construction of retractable elements 11. The material of the fastener receiving hole walls can be of lower hardness than the retractable elements. Materials which are suitable for use in the receiving hole wall include aluminum and other ductile materials which can be permanently or elastically deformed by retractable elements 11. However, the retractable elements 11 could be designed so as to engage a portion of an object other than a wall of a hole.

The fastening system according to the invention comprises the above described vacuum compatible fasteners and an installation tool which is capable of installing and removing the fasteners. With reference to FIGS. 2–4, installation tool 12 comprises a head 13 capable of engaging and holding the head section of the fastener. The installation tool further includes a rod 14 which can be inserted into the fastener through opening 6 in the head section, and which extends into fastener 1 along central axis 10.

Installation tool 12 is configured so as to be capable of stretching shank section 3 while retracting and/or extending retractable elements 11. Preferably, installation tool 12 is configured such that rotation of the tool effects retraction of elements 11 by camming the ends of elements 11 which extend inwardly relative to the tubular member which in turn pivots the clamping elements and retracts the holding or inner ends of the clamping elements. In this manner, extension and/or retraction of the elements 11 can be brought about by rotation of the installation tool rod 14 about the central axis thereof. In such a case, a wide portion 18 of the installation tool rod in contact with a respective element 11 can be rotated to a position at which a thinner portion 19 is in contact with the lower end of the element 11 thus allowing the upper end of the element 11 to elastically bend away from the tubular section 8 and press outwardly against the wall of the hole. As described above in reference to FIG. 1, the engaging portions of the retractable elements of the inventive fastener are extended when the fastener is in the static state, i.e., when there is no external force exerted on the fastener. In this state, the upper portion of extendible element 11 contacts the workpiece while the lower end of element 11 bends inwardly towards axis 10. In order to retract the elements, the rod of the exemplary installation tool is inserted into the fastener and rotated about its central axis until contact is made between the wide portion of the rod and the lower portions of retractable element 11.

Alternatively, the engaging portions of the tip elements may be retracted in the static state and extended by action of the installation tool.

The size and shape of rod 14 of the installation tool can vary depending upon the dimensions of the fasteners. Installation tool rod 14 should be adequately strong such that the rod does not deform. For instance, for a ¼ inch diameter fastener, it is preferable that the diameter of the rod is ⅛ inch or more, and that the length of the rod is greater than about ⅞ inch.

The inventive methods for fastening two objects together and for removing the inventive fastener will now be described with reference to FIGS. 2–5. During fastening of an object, fastening tool 12 is first inserted into fastener 1 such that projections 17 of head 13 engage tabs 20 of fastener head 2. Next, while fastener head section 2 is engaged and held by head 13 of the installation tool, retractable elements 11 are displaced into the retracted position (see FIG. 2) by rod 14 of the installation tool rod 12. The rod 14 also axially stretches shank section 3 (e.g., coil 9) by exerting a force against tip 21 located at the bottom of tip section 4.

The fastener is next inserted through a hole in object 16 and into fastener receiving hole 15 in object 23 (see FIG. 3), with the installation tool still connected to the fastener. In one possible configuration of the installation tool, rod 14 is rotated 90° about the rod central axis. This action allows retractable element 11 to deflect outwardly and engage the inner surface of the hole 15 (see FIG. 4). Because the material of the retractable elements is of greater hardness than that of the fastener receiving hole wall, the elements are able to bite into the material of the receiving hole. The rod is then withdrawn, which allows the pretensioned shank section 9 to pull the fastener head 2 against the object 16 and thus press the object 16 towards an object 23 in which the hole 15 is located. The installation tool head 13 is then rotated to disengage it from the fastener head 2.

Upon disconnection and removal of the fastening tool 12 from the fastener 1, a tension or upward force is created by shank section 3, which tends to urge the edges of retractable elements 11 and head section 2 toward each other even when the fastener and workpiece are exposed to thermal cycling, e.g., heating and cooling from ambient to 300° C. or more.

Removal of the inventive vacuum compatible fastener from a workpiece is accomplished in much the same manner as installation thereof. To remove the fastener, installation tool 12 is first inserted into the fastener, and head section 2 is engaged and held with head 13 of the tool. Shank section 3 is next stretched, to reduce the tension therein, and retractable elements 11 are pivoted so as to be retracted by inserting the rod and/or by rotation of installation tool rod 14 about its central axis. The fastener is then removed from object 16, together with the installation tool.

Use of the inventive fastener and fastener system provides a number of advantages over threaded fasteners. For example, contamination levels within the vacuum chambers can be significantly reduced when using the inventive fasteners as compared with the levels obtained with threaded fasteners. Trapped contamination is effectively eliminated by limiting or minimizing the area of contact between surfaces of the fastener and workpiece in combination with the use of high contact forces.

The inventive fasteners also provide an exceptionally high conductance compared with threaded fasteners. The opening along the central axis of the fastener together with the provision of clearances between surfaces of the fasteners and workpiece allows for rapid pumpdown rates. Accordingly, the time to reach base pressure in a processing tool can be minimized, thereby considerably increasing production throughput.

Furthermore, surface treatments which are generally incompatible with threaded fasteners as a result of their rough surfaces, can be used with the smooth surfaced inventive fasteners. For example, the inventive fastener is compatible with surface treatments designed to minimize surface adsorption and outgassing, as well as with liquid cleaning agents. Moreover, the high conductance of the fastener allows the use of desorption acceleration techniques such as plasma bombardment or UV irradiation to further increase pumpdown rate. The inventive fastener is also compatible with coatings/platings which may be required to provide chemical resistance against the materials used inside the vacuum chamber.

In addition, as a result of the relatively friction-free method of installing the inventive fasteners, the installation method minimizes particle generation. Because particulate generation is significantly less than that obtained with threaded fasteners, a significant improvement in device yield (e.g., integrated circuit, flat panel display processing, etc.) can be realized with the inventive fasteners. Moreover, there is lower risk to damaging the workpiece, since commonly encountered problems in using threaded fastener, such as stripping threaded holes or otherwise seriously damaging the workpiece can be eliminated. As a result, processing tool downtime can effectively be reduced, thereby increasing production throughput.

The inventive fastener further offers a number of mechanical advantages over threaded fasteners. For example, the inventive fasteners allow for a controlled clamping force, established and maintained by the spring or spring-like element in the shank section. This clamping force is consistent and independent of installation technique.

In addition, the shank spring or spring-like element renders the inventive fastener highly resistant to mechanical creep and loss of clamping force caused by vibration and/or thermal cycling, a problem frequently encountered with threaded fasteners. This aspect is particularly advantageous in light of the frequent need to bake out vacuum systems.

It is possible to embody the invention in specific forms other than those described above without departing from the spirit of the present invention. The embodiments described above are merely illustrative and should not be considered restrictive in any way. The scope of the invention is given in the appended claims, rather than the preceding description, and all variations and equivalents which fall within the range of the claims are intended to be embraced therein.

What is claimed is:

1. A removable threadless fastener comprising:
   a head portion having at least one opening extending therethrough and at least one bearing surface on a first side thereof; and
   a shank portion extending from the first side of the head portion, the shank portion having at least one channel extending therethrough and in fluid communication with the opening, the shank portion including a resiliently held clamping element which is retractable by use of an insertion tool.

2. The fastener of claim 1, wherein the bearing surface engages a first object and the clamping element engages a second object so as to attach the first object to the second object.

3. The fastener of claim 2, further comprising a tool for insertion of the fastener, the tool including a rod sized to pass through the opening and the channel and move the clamping element towards and away from the shank portion by rotation of the rod, the rod being operable to move the clamping element into engagement with a wall of a hole in the second object.

4. The fastener of claim 1, wherein the first side of the head portion includes a plurality of projections, each of the projections having a bearing surface thereon.

5. The fastener of claim 1, wherein the shank portion includes a spring portion and a tip portion, the spring portion connecting the tip portion to the head portion and allowing the head portion and tip portion to move axially toward and away from each other.

6. The fastener of claim 5, wherein the tip portion comprises a tubular member, the clamping member being integral with the tubular member and a deflectable portion of the clamping member being displaceable towards and away from the tubular member.

7. The fastener of claim 6, wherein the deflectable portion of the clamping member comprises an end of the clamping member facing the first side of the head portion, the deflectable portion being spaced outwardly from an outer periphery of the tubular member, the deflectable member being displaceable into a cut-out in the tubular member when the shank portion is inserted into a hole of an object.

8. The fastener of claim 5, wherein the spring portion comprises a helical spring and the tip portion includes a tubular member, one end of the helical spring being welded to the head portion and an opposite end of the helical spring being welded to an end of the tubular member.

9. The fastener of claim 5, wherein the bearing surface engages a first object and the clamping element engages a second object so as to attach the first object to the second object, the spring portion being axially extended and pressing the bearing surface and clamping element towards each other.

10. A removable fastener comprising:
    a head portion having a plurality of openings extending therethrough and a plurality of bearing surfaces on a first side thereof; and
    a shank portion extending from the first side of the head portion, the shank portion having at least one channel extending therethrough and in fluid communication with the opening, the shank portion including a plurality of resiliently held clamping elements which are retractable by use of an insertion tool.

11. The fastener of claim 10, wherein the bearing surfaces engage a first object and the clamping elements engage a second object so as to attach the first object to the second object.

12. The fastener of claim 11, further comprising a tool for insertion of the fastener, the tool including a rod sized to pass through the opening and the channel and move the clamping element towards and away from the shank portion by rotation of the rod, the rod being operable to move the clamping element into engagement with a wall of a hole in the second object.

13. The fastener of claim 10, wherein the shank portion includes a spring portion and tip portion, the spring portion connecting the tip portion to the head portion and allowing the head portion and tip portion to move axially toward and away from each other.

14. The fastener of claim 13, wherein the tip portion comprises a tubular member, the clamping members being integral with the tubular member and a deflectable portion of each of the clamping members being displaceable towards and away from the tubular member.

15. The fastener of claim 14, wherein the deflectable portion of each of the clamping members comprises an end of the clamping member facing the first side of the head portion, the deflectable portion being spaced outwardly from an outer periphery of the tubular member, the deflectable member being displaceable into a cut-out in the tubular member when the shank portion is inserted into a hole of an object.

16. The fastener of claim 13, wherein the spring portion comprises a helical spring and the tip portion includes a tubular member, one end of the helical spring being welded to the head portion and an opposite end of the helical spring being welded to an end of the tubular member.

17. The fastener of claim 13, wherein the bearing surfaces engage a first object and the clamping elements engage a second object so as to attach the first object to the second object, the spring portion being axially extended and pressing the bearing surface and clamping element towards each other.

18. A vacuum compatible removable fastener useful for attachment to a workpiece, comprising:
- a head section at an upper end of the fastener, the head section having a first diameter;
- a shank section extending from the head section, the shank section including an elastic element which allows the fastener to be stretched and pretensioned, the shank section having a second diameter smaller than the first diameter; and
- a tip section extending from the shank section, the tip section including at least one element for gripping a sidewall of a workpiece receiving hole, wherein the element is retractable by use of an insertion tool.

19. The vacuum compatible fastener of claim 18, wherein a lower surface of the head section is non-planar.

20. The vacuum compatible fastener of claim 19, wherein the lower surface of the head section is contoured so as to minimize contact with a workpiece to be fastened.

21. The vacuum compatible fastener of claim 19, wherein the lower surface of the head section includes a plurality of spaced apart projections located on an outer portion of the head section.

22. The vacuum compatible fastener of claim 18, wherein the elastic element is integral with the fastener.

23. The vacuum compatible fastener of claim 22, further comprising a tool for insertion of the fastener, the tool including a rod sized to pass through an opening in the head portion, the shank section and the tip section and move the retractable element towards and away from the tip section by rotation of the rod.

24. The vacuum compatible fastener of claim 18, wherein the elastic element is a prefabricated tension spring.

25. The vacuum compatible fastener of claim 18, wherein the head portion includes an opening extending therethrough and the shank section comprises a tubular member having a channel extending therethrough, the channel being in fluid communication with the opening.

26. The vacuum compatible fastener of claim 18, wherein the elastic element is constructed from stainless steel, copper or bronze.

27. The vacuum compatible fastener of claim 18, wherein the at least one retractable element is constructed from stainless steel.

* * * * *